United States Patent
Lan et al.

(10) Patent No.: US 10,925,281 B2
(45) Date of Patent: Feb. 23, 2021

(54) SURFACE DISINFECTANT WITH RESIDUAL BIOCIDAL PROPERTY

(71) Applicants: Microban Products Company, Huntersville, NC (US); W.M. Barr & Company, Inc., Memphis, TN (US)

(72) Inventors: Tian Lan, Huntersville, NC (US); Samuel James Hanna, Charlotte, NC (US); Gina Parise Sloan, Statesville, NC (US); Brian Patrick Aylward, Concord, NC (US); Karen Terry Welch, Kannapolis, NC (US); Dennis Earl Shireman, Marion, AR (US); Kevin Andrew Kavchok, Iron Station, NC (US); Charles L. Hawes, Cordova, TN (US); Jesse Douglas Turmenne, Mount Holly, NC (US); Matthew Michael Petkus, Memphis, TN (US)

(73) Assignees: Microban Products Company, Huntersville, NC (US); W.M. Barr & Company, Inc., Memphis, TN (US)

( * ) Notice: Subject to any disclaimer, the term of this patent is extended or adjusted under 35 U.S.C. 154(b) by 0 days.

(21) Appl. No.: 15/625,612

(22) Filed: Jun. 16, 2017

(65) Prior Publication Data
US 2017/0280716 A1 Oct. 5, 2017

Related U.S. Application Data

(63) Continuation-in-part of application No. 15/162,068, filed on May 23, 2016, which is a continuation-in-part of application No. 14/948,962, filed on Nov. 23, 2015.

(60) Provisional application No. 62/084,917, filed on Nov. 26, 2014, provisional application No. 62/127,075, filed on Mar. 2, 2015, provisional application No. 62/166,403, filed on May 26, 2015.

(51) Int. Cl.
| | | |
|---|---|---|
| A01N 33/12 | (2006.01) | |
| A01N 25/24 | (2006.01) | |
| A01N 25/30 | (2006.01) | |
| A01N 25/08 | (2006.01) | |
| A01N 25/34 | (2006.01) | |
| A01N 25/10 | (2006.01) | |

(52) U.S. Cl.
CPC .......... *A01N 33/12* (2013.01); *A01N 25/10* (2013.01)

(58) Field of Classification Search
None
See application file for complete search history.

(56) References Cited

U.S. PATENT DOCUMENTS

| | | |
|---|---|---|
| 2,897,182 A | 7/1959 | Benneville et al. |
| 3,481,689 A | 12/1969 | Rosdahl et al. |
| 3,505,297 A | 4/1970 | Sheetz et al. |
| 3,673,097 A | 6/1972 | de Vroome |
| 3,752,793 A | 8/1973 | Dieter et al. |
| 3,997,460 A | 12/1976 | Sirine et al. |
| 4,144,211 A | 3/1979 | Chamberlin et al. |
| 4,186,191 A | 1/1980 | Chamberlin et al. |
| 4,326,977 A | 4/1982 | Schmolka |
| 4,408,001 A | 10/1983 | Ginter et al. |
| 4,481,167 A | 11/1984 | Ginter et al. |
| 4,486,246 A | 12/1984 | Warchol |
| 4,585,482 A | 4/1986 | Tice et al. |
| 4,601,954 A | 7/1986 | Coleman |
| 4,719,105 A | 1/1988 | Schleppnik |
| 4,837,005 A | 6/1989 | Brode, II et al. |
| 4,912,154 A | 3/1990 | Arora et al. |
| 4,941,989 A | 7/1990 | Kramer et al. |
| 4,990,339 A | 2/1991 | Scholl et al. |
| 4,999,386 A | 3/1991 | Oakes et al. |
| 5,032,434 A | 7/1991 | Sanchez et al. |
| 5,051,124 A | 9/1991 | Pera |
| 5,061,485 A | 10/1991 | Oakes et al. |
| 5,183,601 A | 2/1993 | Jisai et al. |
| 5,472,689 A | 12/1995 | Ito |
| 5,529,713 A | 6/1996 | Gauthier-Fournier |
| 5,536,505 A | 7/1996 | Wilson et al. |
| 5,547,990 A | 8/1996 | Hall et al. |

(Continued)

FOREIGN PATENT DOCUMENTS

| | | |
|---|---|---|
| AU | 693463 | 7/1998 |
| AU | 19999054305 A1 | 5/2000 |

(Continued)

OTHER PUBLICATIONS

Promolgen D—Lubrizol: retrieved from internet: https://www.lubrizol.com/-/media/Lubrizol/Life-Sciences/ . . . /TDS/Promolgen-D.pdf. Retrieved on Nov. 7, 2018.*
Bardac; http://bio.lonza.com/uploads/tx_mwaxmarketingmaterial/Lonza_ProductDataSheets_Bardac_208M_PDS.pdf) Nov. 29, 2007, pp. 1-2.
International Search Report and Written Opinion of corresponding application PCT/US2015/062471, dated Jan. 14, 2016, all enclosed pages cited.
International Search Report and Written Opinion of corresponding application PCT/US2015/062475, dated Feb. 5, 2016, all enclosed pages cited.

(Continued)

*Primary Examiner* — Hong Yu
(74) *Attorney, Agent, or Firm* — Nelson Mullins Riley & Scarborough LLP

(57) ABSTRACT

A disinfectant formulation comprising a poly(2-ethyl-2-oxazoline) and a quaternary ammonium compound or combination of quaternary ammonium compounds is provided. A wipe having a residual biocidal property is also provided. The wipe formulation comprises a substrate comprised of a fibrous material, and the formulation present on or in the substrate. The formulation comprises a poly(2-ethyl-2-oxazoline), a quaternary ammonium compound or combination of quaternary ammonium compounds, a surfactant, water, and an optional fragrance.

20 Claims, No Drawings

(56) References Cited

U.S. PATENT DOCUMENTS

| | | | |
|---|---|---|---|
| 5,645,823 A | 7/1997 | Thrall et al. | |
| 5,654,154 A | 8/1997 | Bronstein et al. | |
| 5,756,145 A | 5/1998 | Darouiche | |
| 5,762,948 A * | 6/1998 | Blackburn | A01N 37/46 424/402 |
| 5,776,479 A | 7/1998 | Pallos et al. | |
| 5,849,310 A | 12/1998 | Trinh et al. | |
| 5,929,016 A | 7/1999 | Harrison | |
| 5,932,253 A | 8/1999 | Trinh et al. | |
| 6,080,387 A | 6/2000 | Zhou et al. | |
| 6,106,820 A | 8/2000 | Morrissey et al. | |
| 6,110,387 A | 8/2000 | Choudhury et al. | |
| 6,136,770 A | 10/2000 | Cheung et al. | |
| 6,139,856 A | 10/2000 | Kaminska et al. | |
| 6,159,924 A | 12/2000 | Weller et al. | |
| 6,180,584 B1 | 1/2001 | Sawan et al. | |
| 6,194,075 B1 | 2/2001 | Sargeant et al. | |
| 6,270,754 B1 | 8/2001 | Zhou et al. | |
| 6,294,186 B1 | 9/2001 | Beerse et al. | |
| 6,458,906 B1 | 10/2002 | Torgerson et al. | |
| 6,559,111 B2 | 5/2003 | Colcurclello, Jr. et al. | |
| 6,613,755 B2 | 9/2003 | Peterson et al. | |
| 6,616,922 B2 | 9/2003 | Taylor et al. | |
| 6,645,507 B2 | 11/2003 | Bettle et al. | |
| 6,797,278 B2 | 9/2004 | Jackson et al. | |
| 6,936,580 B2 | 8/2005 | Sherry et al. | |
| 7,304,022 B2 | 12/2007 | Cheung et al. | |
| 7,470,656 B2 | 12/2008 | Sherry et al. | |
| 7,488,757 B2 | 2/2009 | Hoang et al. | |
| 7,704,935 B1 | 4/2010 | Davis et al. | |
| 7,713,955 B2 | 5/2010 | Whiteford et al. | |
| 7,723,108 B2 | 5/2010 | Truncale et al. | |
| 8,119,732 B2 | 2/2012 | Hanrot | |
| 8,153,613 B2 | 4/2012 | Ahmed et al. | |
| 8,163,101 B2 | 4/2012 | Dooley et al. | |
| 8,178,484 B2 | 5/2012 | Schwarz et al. | |
| 8,268,337 B2 | 9/2012 | Wheeler | |
| 8,317,934 B2 | 11/2012 | Kholodenko et al. | |
| 8,343,523 B2 | 1/2013 | Toreki et al. | |
| 8,343,908 B2 | 1/2013 | Mundschau et al. | |
| 8,440,606 B2 | 5/2013 | Mundschau et al. | |
| 8,575,085 B2 | 11/2013 | Schwarz et al. | |
| 8,926,999 B2 | 1/2015 | Toreki et al. | |
| 9,237,831 B1 * | 1/2016 | Luu | A47K 10/16 |
| 2002/0119902 A1 | 8/2002 | Harrison et al. | |
| 2003/0114342 A1 | 6/2003 | Hall | |
| 2003/0143264 A1 | 7/2003 | Margiotta | |
| 2003/0147925 A1 | 8/2003 | Sawan et al. | |
| 2005/0003163 A1 | 1/2005 | Krishnan | |
| 2005/0008676 A1 | 1/2005 | Qiu et al. | |
| 2005/0042240 A1 | 2/2005 | Utterberg et al. | |
| 2006/0068024 A1 | 3/2006 | Schroeder et al. | |
| 2006/0193816 A1 | 8/2006 | Elfersy et al. | |
| 2006/0213801 A1 | 9/2006 | Karaoren et al. | |
| 2006/0269441 A1 | 11/2006 | Ochomogo et al. | |
| 2007/0023129 A1 | 2/2007 | Stieler et al. | |
| 2007/0036672 A1 | 2/2007 | Fratini et al. | |
| 2007/0166403 A1 | 7/2007 | McArdle | |
| 2007/0231291 A1 | 10/2007 | Huang et al. | |
| 2007/0254979 A1 | 11/2007 | Salz et al. | |
| 2008/0020127 A1 | 1/2008 | Whiteford et al. | |
| 2008/0026026 A1 | 1/2008 | Lu et al. | |
| 2008/0131395 A1 | 6/2008 | Wellinghoff et al. | |
| 2008/0185332 A1 | 8/2008 | Niu et al. | |
| 2008/0197112 A1 | 8/2008 | Wang et al. | |
| 2008/0207581 A1 | 8/2008 | Whiteford et al. | |
| 2009/0087393 A1 | 4/2009 | Jensen et al. | |
| 2009/0181060 A1 * | 7/2009 | Rosato | A61K 8/0208 424/402 |
| 2009/0194479 A1 | 8/2009 | Niu et al. | |
| 2009/0238948 A1 | 9/2009 | Muller et al. | |
| 2010/0015236 A1 | 1/2010 | Magdassi et al. | |
| 2010/0035997 A1 | 2/2010 | Broadley et al. | |
| 2010/0062966 A1 | 3/2010 | Lincoln et al. | |
| 2010/0189595 A1 | 7/2010 | Webster | |
| 2010/0197748 A1 | 8/2010 | Schwarz et al. | |
| 2010/0215643 A1 | 8/2010 | Clevenger et al. | |
| 2010/0216889 A1 | 8/2010 | Modak et al. | |
| 2010/0305064 A1 * | 12/2010 | Walsh | A61K 8/06 514/60 |
| 2011/0065346 A1 | 3/2011 | Bender et al. | |
| 2011/0177146 A1 | 7/2011 | Cahill et al. | |
| 2011/0200655 A1 | 8/2011 | Black et al. | |
| 2012/0034287 A1 | 2/2012 | Napolitano et al. | |
| 2012/0045583 A1 | 2/2012 | Frenkel et al. | |
| 2012/0071525 A1 | 3/2012 | Schwarz et al. | |
| 2012/0148751 A1 | 6/2012 | Herdt et al. | |
| 2012/0178817 A1 | 7/2012 | Yin et al. | |
| 2012/0183606 A1 | 7/2012 | Bender et al. | |
| 2012/0213865 A1 | 8/2012 | McCullough et al. | |
| 2013/0101674 A1 | 4/2013 | Toft | |
| 2013/0138085 A1 | 5/2013 | Tennican | |
| 2013/0204212 A1 | 8/2013 | Tennican | |
| 2013/0280313 A1 | 10/2013 | Yoon et al. | |
| 2013/0281549 A1 | 10/2013 | Bonutti | |
| 2013/0323188 A1 | 12/2013 | Kabanov et al. | |
| 2014/0011766 A1 | 1/2014 | Krafft | |
| 2014/0080977 A1 | 3/2014 | Youngblood et al. | |
| 2014/0121230 A1 | 5/2014 | De Asis | |
| 2014/0170197 A1 | 6/2014 | Kabanov et al. | |
| 2014/0220331 A1 | 8/2014 | Lord et al. | |
| 2014/0242015 A1 | 8/2014 | Fares et al. | |
| 2014/0314664 A1 | 10/2014 | Qin et al. | |
| 2014/0322285 A1 | 10/2014 | Bui et al. | |
| 2015/0017215 A1 | 1/2015 | Wahal et al. | |
| 2015/0190543 A1 | 7/2015 | Marshall et al. | |
| 2015/0307718 A1 | 10/2015 | Colak et al. | |
| 2016/0058008 A1 | 3/2016 | Cao et al. | |
| 2016/0143275 A1 | 5/2016 | Lan et al. | |
| 2016/0143276 A1 | 5/2016 | Lan et al. | |
| 2016/0262382 A1 | 9/2016 | Lan et al. | |
| 2016/0262383 A1 | 9/2016 | Lan et al. | |

FOREIGN PATENT DOCUMENTS

| | | |
|---|---|---|
| CA | 1081119 | 7/1980 |
| CN | 1129946 A | 8/1996 |
| CN | 1061055 C | 1/2000 |
| CN | 1285081 A | 2/2001 |
| CN | 1351647 A | 5/2002 |
| CN | 101473825 A | 7/2009 |
| CN | 101715784 A | 6/2010 |
| CN | 102215874 A | 10/2011 |
| CN | 102365584 A | 2/2012 |
| CN | 102481264 A | 5/2012 |
| CN | 102965214 A | 3/2013 |
| CN | 103161071 | 6/2013 |
| CN | 107231806 | 10/2017 |
| DE | 4118723 A1 | 1/1992 |
| EP | 0483426 A1 | 5/1992 |
| EP | 0290739 B1 | 2/1993 |
| EP | 0290676 B1 | 8/1994 |
| EP | 0431739 B1 | 12/1998 |
| EP | 1100858 A1 | 5/2001 |
| EP | 1104449 A1 | 6/2001 |
| EP | 0935646 B1 | 5/2003 |
| EP | 1179039 B2 | 4/2004 |
| EP | 1111995 B1 | 2/2005 |
| EP | 1054596 B1 | 4/2009 |
| EP | 2179019 A2 | 4/2010 |
| EP | 2459659 B1 | 7/2013 |
| FR | 2994095 A1 | 2/2014 |
| GB | 1195796 | 6/1970 |
| GB | 1553132 | 9/1979 |
| GB | 2339795 B | 6/2000 |
| GB | 2318585 B | 9/2000 |
| GB | 2340503 B | 10/2000 |
| GB | 2353043 A | 2/2001 |
| GB | 2340501 B | 7/2002 |
| GB | 2407581 A | 5/2005 |
| JP | 55-120627 | 9/1980 |
| JP | 63201041 | 8/1988 |
| JP | 04-041599 A | 2/1992 |
| JP | H0776113 B2 | 8/1995 |

(56) References Cited

FOREIGN PATENT DOCUMENTS

| | | |
|---|---|---|
| JP | 2005154965 A | 6/2005 |
| JP | 2005516809 A | 6/2005 |
| JP | 2007270374 A | 10/2007 |
| JP | 2014070304 A | 4/2014 |
| JP | 2015089975 A | 5/2015 |
| JP | 2017536420 A | 12/2017 |
| RU | 2329286 C1 | 7/2008 |
| RU | 2011102780 A | 6/2009 |
| RU | 2010146005 A | 5/2012 |
| RU | 2523714 C2 | 7/2014 |
| WO | WO 1991015186 A1 | 10/1991 |
| WO | WO 1995021602 A1 | 8/1995 |
| WO | WO 1998029085 A1 | 7/1998 |
| WO | 1998055096 A1 | 12/1998 |
| WO | WO 1999029173 A1 | 6/1999 |
| WO | 9935227 A1 | 7/1999 |
| WO | WO 2000005330 A1 | 2/2000 |
| WO | WO 2000009640 A1 | 2/2000 |
| WO | 2003066791 A1 | 8/2003 |
| WO | WO 2006036909 A1 | 4/2006 |
| WO | WO 2006086271 A2 | 8/2006 |
| WO | WO 2007070801 A2 | 6/2007 |
| WO | WO 2007100653 A2 | 9/2007 |
| WO | WO 2007101445 A1 | 9/2007 |
| WO | WO 2007140267 A1 | 12/2007 |
| WO | WO 2008049616 A1 | 5/2008 |
| WO | WO 2008100993 A1 | 8/2008 |
| WO | WO 2008127416 A2 | 10/2008 |
| WO | WO 2008137381 A1 | 11/2008 |
| WO | WO 2008154395 A1 | 12/2008 |
| WO | WO 2009010749 A2 | 1/2009 |
| WO | WO 2009010749 A3 | 1/2009 |
| WO | WO 2009089346 A2 | 7/2009 |
| WO | 2009156180 A2 | 12/2009 |
| WO | WO 2010080652 A1 | 7/2010 |
| WO | 2010089484 A1 | 8/2010 |
| WO | WO 2010144503 A4 | 12/2010 |
| WO | WO 2011064554 A1 | 6/2011 |
| WO | WO 2011148160 A1 | 12/2011 |
| WO | WO 2012146917 A1 | 11/2012 |
| WO | WO 2012149591 A1 | 11/2012 |
| WO | 2013052454 | 4/2013 |
| WO | WO 2013082187 A1 | 6/2013 |
| WO | WO 2013102021 A2 | 7/2013 |
| WO | 2013/124784 | 8/2013 |
| WO | 2013173742 A1 | 11/2013 |
| WO | 2014/099518 A2 | 6/2014 |
| WO | 2014099465 A1 | 6/2014 |
| WO | WO 2014100778 A1 | 6/2014 |
| WO | WO 2014143705 A1 | 9/2014 |
| WO | WO 2015078496 A1 | 6/2015 |
| WO | WO 2016086012 A1 | 6/2016 |
| WO | WO 2016086014 A1 | 6/2016 |
| WO | WO 2017091250 A1 | 6/2017 |
| WO | WO 2017091251 A1 | 6/2017 |
| WO | WO 2017205244 A1 | 11/2017 |
| WO | WO 2017205328 A1 | 11/2017 |

OTHER PUBLICATIONS

International Search Report and Written Opinion of corresponding application PCT/US2016/033889, dated Aug. 23, 2016, all enclosed pages cited.

International Search Report and Written Opinion of corresponding application PCT/US2016/033891, dated Aug. 22, 2016, all enclosed pages cited.

International Search Report and Written Opinion of corresponding application PCT/US2017/033750, dated Aug. 14, 2017, all enclosed pages cited.

International Search Report and Written Opinion of corresponding application PCT/US2017/033930, dated Aug. 23, 2017, all enclosed pages cited.

International Search Report and Written Opinion of corresponding application PCT/US2017/033964, dated Aug. 29, 2017, all enclosed pages cited.

International Search Report and Written Opinion of corresponding application PCT/US2018/037354, dated Sep. 10, 2018, all enclosed pages cited.

Supplementary Partial Search Report for corresponding European Patent Application No. 15864079.7, dated May 4, 2018, all enclosed pages cited.

Supplementary European Search Report for corresponding European Patent Application No. 15864079.7, dated Aug. 14, 2018, all enclosed pages cited.

Nuview, Continu Surface Cleaner and Disinfectant, Continu 2 in 1 Cleaner & Disinfectant, http://voroscopes.co.uk/continu/surface-disinfectant/, accessed Oct. 17, 2016, all enclosed pages cited.

Difference between Corrosion and Rusting: retrieved from internet: http://www.differencebetween.com/difference-between-corrosion-and-vs-rusting/ , retrieved Mar. 29, 2017.

Waschinski et al., "insights In the Antibacterial Action of Poly(methyloxazoline)s with a Biocidal End Group and Varying Satellite Groups", Biomacromolecules 2008, vol. 9, pp. 1764-1771, abstract, p. 1766, Scheme 1, p. 1767, Table 1.

Waschinski C J et al., "Poly(oxazoline)s with Telechelic Antimicrobial Functions", Biomacromolecules, American Chemical Society, vol. 6, Jan. 1, 2005, p. 235-243.

Ferreira, C., et al. Physiological changes induced by the quaternary ammonium compound benzyldimethyldodecylammonium chloride on Pseudomonas fluorescens, Journal of Antimicrobial Chemotherapy, p. 1036-1043, Feb. 8, 2011, Oxford University Press.

Ioannou, C.J., et al., Action of Disinfectant Quaternary Ammonium Compounds against *Staphylococcus aureus*, Antimicrobial Agents and Chemotherapy, American Society for Microbiology, 2007, p. 296-306.

Knol, M.J., et al., Estimating measures of interaction on an additive scale for preventive exposures, European Journal of Epidemiology, 2011, 26(6): p. 433-438.

SRLChem (http://www.srlchem.com/brochures/SRL%20Analytical%20Solvents,%20Ion%20Pairing%20reagents%20and%20Quartnery%20Ammonium%20Compounds%202016-17.pdf) accessed Jun. 4, 2018, pp. 1-6, (2018).

Siedenbiedel, F, et al., Antimicrobial Polymers in Solution and on Surfaces: Overview and Functional Principles. Polymers. Jan. 9, 2012, vol. 4, pp. 46-71, p. 52, Third Paragraph; p. 55; First Paragraph to Second Paragraph; p. 55, Figure 7, Figure 7—Caption; p. 58, Second Paragraph to Third Paragraph; p. 59, Sections 4, 4.1, p. 60, First Paragraph to Second Paragraph; all enclosed pages cited.

Aquazol 500 MSDS, Jan. 11, 2016, Retrieved from the internet, Retrieved from https:shop.kremerpigments.com/media/pdf/63905_MSDS.pdf.

European Search Report for corresponding European Patent Application No. 16869007.1, dated Mar. 28, 2019, all enclosed pages cited.

Konradi, Rupert et al. "Polyoxazolines for Nonfouling Surface Coatings—A Direct Comparison to the Gold Standard PEG," Macromolecular Rapid Communications, vol. 33, No. 19, Oct. 15, 2012, pp. 1663-1676.

European Search Report for corresponding European Patent Application No. 15864294.2, dated May 3, 2019, all enclosed pages cited.

European Search Report for corresponding European Patent Application No. 15864079.7, dated May 3, 2019, all enclosed pages cited.

Search Report for corresponding Russian Patent Application No. 2017121864, dated May 28, 2019, all enclosed pages cited.

First Office Action and Search Report for corresponding Chinese Patent Application No. 201580074480.9, dated Jul. 24, 2019, all enclosed pages cited.

First Office Action and Search Report for corresponding Chinese Patent Application No. 201580074496.X, dated Aug. 1, 2019, all enclosed pages cited.

Offical Action for corresponding Japanese Patent Application No. 2017-547381, dated Nov. 8, 2019, all enclosed pages cited.

Search Report for corresponding Russian Patent Application No. 2017121867, completed on May 29, 2019, all enclosed pages cited.

(56) References Cited

OTHER PUBLICATIONS

Japanese Office Action from Japanese Patent Application No. 2018-526204, dated Apr. 23, 2020, all pages enclosed.
Japanese Office Action from Japanese Patent Application No. 2018-526221, dated Apr. 23, 2020, all pages enclosed.
Chinese Office Action and Search Report from Chinese Patent Application No. 201680079606.6, dated Apr. 24, 2020, all pages enclosed. [only new art cited herein].
European Supplemental Search Report for European Patent Application No. 17803346.0, dated Nov. 8, 2019, all pages enclosed. [only new art cited herein].
European Supplemental Search Report for European Patent Application No. 17803393.2, dated Dec. 10, 2019, all pages enclosed. [only new art cited herein].
Russian Office Action and Search Report from Russian Patent Application No. 2018122619, dated Aug. 22, 2019.
Japanese Office action from Japanese Patent Application No. 2017-547381, dated Jul. 1, 2020.
Chinese Office Action and Search Report from Chinese Patent Application No. 201680079623.X, dated Apr. 10, 2020, all pages enclosed.

\* cited by examiner

SURFACE DISINFECTANT WITH RESIDUAL BIOCIDAL PROPERTY

CROSS-REFERENCE TO RELATED APPLICATIONS

This application is a continuation-in-part application claiming priority from U.S. continuation-in-part patent application Ser. No. 15/162,068, filed on May 23, 2016, which claims priority from U.S. patent application Ser. No. 14/948,962, filed on Nov. 23, 2015, which claims priority from U.S. provisional patent application Ser. No. 62/084,917, filed on Nov. 26, 2014, and from U.S. provisional patent application Ser. No. 62/127,075, filed on Mar. 2, 2015, and from U.S. provisional patent application Ser. No. 62/166,403, filed on May 26, 2015, in the United States Patent and Trademark Office. The disclosures of which are incorporated herein by reference in their entireties.

FIELD OF THE INVENTION

The present invention relates to the field of disinfectant formulations, and more specifically, to a disinfectant formulation imparting a residual biocidal property.

BACKGROUND OF THE INVENTION

Microbes exist everywhere in the modern world. While some are beneficial to humans and the environment, others may have significant negative consequences for contaminated articles as well as the persons, animals and ecological members coming in contact with them. There are a number of industries and environments where such microbes are especially prevalent.

Healthcare

A hospital-acquired infection (HAI; alternatively a "nosocomial infection") is an infection whose development is favored by a hospital or healthcare environment. Such maladies typically are fungal or bacterial infections and can afflict the victim locally or systemically. Nosocomial infections can cause severe pneumonia as well as infections of the urinary tract, bloodstream, and other parts of the body.

Nosocomial infections have severe medical implications for patients and care providers. In the United States, data suggest that approximately 1.7 million instances of hospital-associated infections occur each year, with nearly 100,000 deaths resulting therefrom. European data and surveys indicate Gram-negative bacterial infections alone account for 8,000-10,000 deaths each year.

Several aggravating factors contribute to the high HAI rate. Hospitals, urgent care centers, nursing homes, and similar facilities focus their treatments on those with serious illnesses and injuries. As a result, these facilities house abnormally highly concentrated populations of patients with weakened immune systems.

A trio of pathogens is commonly found in healthcare settings and together account for approximately one-third of nosocomial infections: coagulase-negative Staphylococci (15%), *Candida* species (11%), and *Escherichia coli* (10%).

Worse, it is the more robust disease-causing pathogens that are present in such environments. The six so-called "ESKAPE pathogens"—*Enterococcus faecium, Staphylococcus aureus, Klebsiella pneumoniae, Acinetobacter baumannii, Pseudomonas aeruginosa*, and *Enterobacter* species—possess antibiotic resistance and are implicated in nearly half of all nosocomial infections. Their resistance to one or more biocidal agents makes such infections particularly dangerous.

In particular, the broad nutritional versatility of *Pseudomonas* permits its survival in extreme environments, including survival on surfaces not intensively cleaned and sterilized. This pathogen's ubiquity in the hospital environment makes it a leading cause of Gram-negative nosocomial infections. Particularly vulnerable are immune-compromised patients (e.g. those afflicted with cystic fibrosis, cancer, or burns).

The most common means of HAIs is through direct or indirect contact transmission. Direct contact transmission involves a patient contacting either a contaminated patient or worker. As care providers move through the healthcare institution, they come into contact with its many patients. These workers unwittingly act in a manner analogous to bees in a garden, "pollinating" rooms and wards as they care for residents.

Indirect contact transmission occurs when the patient contacts a contaminated object or surface. The healthcare environment presents an array of articles capable of passively vectoring pathogens.

Nosocomial infections further deal a serious blow to the volume, quality, and cost of healthcare provided by hospitals and other institutions. In addition to the roughly 100,000 HAI-related deaths occurring annually in the United States, an estimated two million more victims are forced to endure the physical ravages and emotional distress associated with these serious and avoidable illnesses.

Institutions have reacted by creating policies to impose more stringent cleanliness and disinfection requirements upon staff and the patient environment. These programs typically include frequent hand-washing and frequent disinfection of surfaces. Despite implementation of programs to curb nosocomial infections, infections still occur at unacceptably high rates.

Home Care and Household

Household environments also face microbes. A main disadvantage associated with consumer disinfectants and sanitizers is that, while they can be effective at initially killing microbes, the surface is easily and quickly re-contaminated through contact, airborne microbes, and un-killed residual microbes before treatment. While some of the disinfectants would continue to offer some control if simply left on the surface, this would result in a greasy or tacky residue that would be easily negated by casual contact with the surface. Thus, there is a desire for a home care and household cleaner that kills microbes quickly on contact, then acts as a residual disinfectant but yet does not have this undesirable sticky or tacky effect. Such cleaners may be useful for general purpose household cleaning, bathroom cleaning, and spray protectants.

A difference between hospital and healthcare cleaners and household products is the allowable VOC (volatile organic content). The regulations for most non-aerosol household consumer disinfectants are a maximum of 1% VOC.

Food Service

The food service industry also faces outbreaks in contamination of pathogens in the workplace and spreading disease out to consumers. Even though food manufacturers adopt vigorous hygiene plans and comply with tight government hygiene regulations, major outbreaks of microbes are still reported occasionally that causes serious illness among consumers. Disinfectants with residual activities should effectively alleviate the issue.

Biofilm

A biofilm is generally defined as a layer of microorganisms adhering to the surface of a structure, which may be organic or inorganic, that secrete a protective coating that is biological in origin. Biofilms present a large problem for public health because of increased resistance of biofilm-associated organisms to antimicrobial agents and for the potential of biofilm borne organisms to cause infections. Thus, there is a need for a solution to disinfection with regard to biofilms. Current disinfectants do not have the ability to kill biofilms or to seal or lock-in biofilms on surfaces to prevent cross-contamination events and to prevent out growth. There are limited solutions for surface biofilm problems. For example, there is a building body of evidence that surface biofilms pose a problem in the healthcare setting for the above mentioned reasons. In addition, biofilms are a recognized problem of possible contamination within the food industry. Other industries face similar concerns. Thus, there is a need for a solution targeted at potential biofilm problem areas that can be used to eradicate biofilms.

In summary, there remains a need for a formulation able to confer a residual biocidal activity to treated surfaces. It would be further advantageous if the formulation were combined with a surface disinfectant, to enable a single cleaning to both disinfect and impart the residual biocidal effect.

It further would be advantageous for the residual biocidal property to be durably associated with the treated surface, such that it may continue to provide microbial reduction for an extended period of time after application.

It further would be advantageous if there is a formulation(s) effective across a wide range of industries and applications.

SUMMARY OF THE INVENTION

The present invention relates to a disinfectant formulation imparting a residual biocidal property. The disinfectant formulation comprises a polymer binder, wherein the polymer binder is an oxazoline homopolymer or an extended or a modified polymer based on an oxazoline homopolymer, and a biocidal compound. The disinfectant formulation further comprises a carrier.

In an aspect of the invention the oxazoline homopolymer has a structure of:

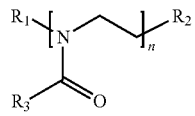

wherein $R_1$ is a hydrogen, alkyl, alkenyl, alkoxy, alkylamino, alkynyl, allyl, amino, anilino, aryl, benzyl, carboxyl, carboxyalkyl, carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group; $R_2$ is a hydrogen, alkyl, alkenyl, alkoxy, alkylamino, alkynyl, allyl, amino, anilino, aryl, benzyl, carboxyl, carboxyalkyl, carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group or a macrocyclic structure; $R_3$ is a hydrogen, alkyl, alkenyl, alkoxy, aryl, benzyl, hydroxyalkyl, or perfluoroalkyl group; and n is in a range of 1 to 1,000,000.

In another aspect of the invention other features of the disinfectant formulation(s) are provided.

In yet another aspect of the invention, an article having the disinfectant formulation(s) of the present invention is provided as well as methods of making, using and applying the disinfectant formulation(s).

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention

DESCRIPTION OF THE PREFERRED EMBODIMENTS

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mold, mildew and algae. Viral particles and other infectious agents are also included in the term microbe.

"Antimicrobial" further should be understood to encompass both microbicidal and microbistatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition may demonstrate efficacy against another class of microbes.

For example, discussion of the strong bacterial efficacy demonstrated by a disclosed embodiment should not be read to exclude that embodiment from also demonstrating antifungal activity. This method of presentation should not be interpreted as limiting the scope of the invention in any way.

Disinfectant Formulation

The present invention is directed to a disinfectant formulation. In an aspect of the invention, the disinfectant formulation is in a liquid form. The composition of the disinfectant formulation comprises a biocidal compound and a polymer binder. The composition may further comprise a solvent (such as water or a low molecular weight alcohol), a surfactant, a colorant, a fragrance, among other components.

A liquid composition is formulated having surface disinfection and residual biocidal properties. The formulation can be applied to a surface by spraying, rolling, fogging, wiping or other means. The formulation acts as a surface disinfectant, killing infectious microbes present on the surface.

Once dried, the liquid formulation leaves a residual protective film on the surface. The residual film possesses a biocidal property, enabling it to maintain protection of the surface against microbial contamination for an extended time period after its application.

In a preferred embodiment, the surface disinfectant formulation imparts a film with the capacity to quickly kill bacteria and other germs for at least 24 hours after deposit of the film on the treated surface. In an aspect of the invention, quick kill generally refers to a time period of about 30 seconds to about 5 minutes. The film will remain on the surface and is durable to multiple touches and wearing of the surface.

In another embodiment of the present invention, the disinfectant formulation is a liquid composition comprising a polymer binder, a biocidal compound, a carrier such as a solvent, and other optional components such as fragrances.

Biofilm Sealant

In an embodiment of the present invention, the disinfectant formulation is a biofilm sealant. The biofilm sealant once applied to a surface forms a polymer film. The polymer film is applied wet and dries as a film layer to lock in and prevent subsequent outgrowth of biofilm microorganisms. The biofilm sealant, although preferably in the form of a liquid, may also take other forms such as a gel, or other form. Once the biofilm sealant is in place, the microbes of the biofilm have limited access to oxygen and exogenous nutrients. The biofilm sealant has the potential to seal in bacteria but also to provide extended release of antimicrobials into the film to kill the microorganisms in the biofilm.

In an embodiment of the present invention, the biofilm sealant comprises a polymer binder and a biocidal compound. The biocidal compound may include, but is not limited to, any biocidal compound set forth herein.

In an embodiment of the present invention, the biofilm sealant comprises an oxazoline homopolymer as the polymer binder. The oxazoline homopolymer may have any of the structures as set forth herein.

In an embodiment of the present invention, the biofilm sealant comprises a polymer binder, a biocidal compound, and an enzyme(s). The enzyme is to assist in degrading the biofilm and provide for enhanced antimicrobial penetration by the biocidal agent and ultimately biofilm removal. Example enzymes include, but are not limited to, proteinase, DNase, RNase, and carbohydrate specific enzymes that can degrade the extracellular matrix associated with the biofilm.

In an embodiment of the present invention, the biofilm selant comprises a polymer binder and an antibody as a biological material for slow release into the film. The antibody functionality will bind to the biofilm microbe to prevent cross-contamination.

In an embodiment of the present invention, the biofilm sealant comprises a polymer binder, and a bacteriophage or a mixture of bacteriophages as a biological material for slow release into the film. The bacteriophage act as a targeted antimicrobial agent to kill biofilm associated organisms.

In an embodiment of the present invention, the biofilm sealant comprises a polymer binder, and a mixture of bacteriophages, antimicrobial agents, enzymes and antibodies as a biological material for slow release into the film.

Polymer Binder

In an aspect of the invention, the polymer binder is an oxazoline homopolymer. As another feature of the invention, the oxazoline homopolymer has the following structure:

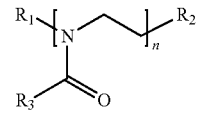

wherein $R_1$ and $R_2$ are end groups determined by the polymerization techniques used to synthesize oxazoline homopolymer. $R_1$ and $R_2$ are independently selected and include, but are not limited to, hydrogen, alkyl, alkenyl, alkoxy, alkylamino, alkynyl, allyl, amino, anilino, aryl, benzyl, carboxyl, carboxyalkyl, carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether groups. Alternatively, $R_2$ could include a macrocyclic structure formed during synthesis as a consequence of intramolecular attack.

For example, $R_1$ is a methyl group and $R_2$ is oxazolinium tosylate if methyl tosylate is used as the initiator in the cationic initiated polymerization of oxazoline.

$R_3$ is an end group determined by the type of oxazoline used in the preparation of the polymer binder of this invention. $R_3$ includes, but is not limited to, hydrogen, alkyl, alkenyl, alkoxy, aryl, benzyl, hydroxyalkyl, or perfluoroalkyl. For example, $R_3$ is an ethyl group if ethyloxazoline is the monomer used to prepare the polymer binder for the present invention.

n is the degree of oxazoline polymerization in the homopolymer. n is in a range of 1 to 1,000,000. Preferably, n is in a range of 500 to 250,000; most preferably, n is in a range of 2500 to 100,000.

Similar to oxazoline homopolymer, extended or modified polymers with some variations based on the oxazoline homopolymer are also suitable for the present invention. The techniques and options for performing chemical or molecular structure variations or modifications to oxazoline should be familiar to those skilled in the art. A class of extended or modified polymers based on oxazoline homopolymer can be represented with the following molecular structure:

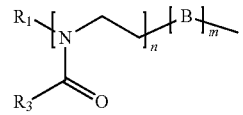

wherein $R_1$ and $R_3$ have the same definition as those given in the above oxazoline homopolymer.

B is additional monomer repeating unit linked to oxazoline in a copolymer. The types of arrangement of the repeating units between B and oxazoline in the copolymer can include, but are not limited to, block, alternating, periodic, or combinations thereof. There is no limitation as to the types of B that can be used to copolymerize with or modify the oxazoline of the present invention.

n is the degree of polymerization for an oxazoline repeating unit; n in the copolymer is in a range of 1 to 1,000,000 and the degree of polymerization for B repeating unit in the copolymer m is in a range of 0 to 500,000 at the same time. Preferably, n is in a range of 500 to 250,000 and m is in a range of 20 to 10,000; and most preferably, n is in a range of 2500 to 100,000 and m is in a range of 50 to 5,000. In addition to linking B to ethyloxazoline through copolymerization, B could also be linked to oxazoline as an end group in a cationic polymerization by using B as a cationic initiator if B itself is already a quaternary ammonium compound.

Not intended to be all inclusive, B can be, for example, ethyleneimine with the following molecular structure:

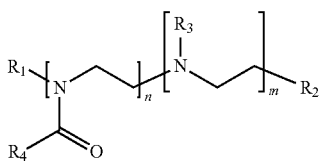

wherein $R_1$ and $R_2$ end groups have the same definition as those outlined for oxazoline homopolymer.

$R_3$ includes, but is not limited to, hydrogen, alkyl, alkenyl, alkoxy, aryl, benzyl, hydroxyalkyl, or perfluoroalkyl.

$R_4$ includes, but is not limited to, hydrogen, alkyl, alkenyl, alkoxy, aryl, benzyl, hydroxyalkyl, or perfluoroalkyl.

m is in a range of 0 to 500,000; preferably, in a range of 20 to 10,000; and most preferably, in a range of 50 to 5,000.

n is in a range of 1 to 1,000,000; preferably, 500 to 250,000; most preferably, in a range of 2500 to 100,000.

The synthesis of oxazoline and ethyleneimine copolymer can be phased into two steps, for example. In a first step, a cationic ring opening polymerization technique can be used to make polyoxazoline homopolymer. In a second step, the polyoxazoline made in the first step can be hydrolyzed to convert part of polyoxazoline repeating units into polyethyleneimine. Alternatively, oxazoline-ethylenimine copolymer can be made with the appropriate respective monomers, an oxazoline and an aziridine. The result would be a cationic polymer having the above structure.

The degree of polymerization for oxazoline repeating unit n in the copolymer is in a range of 1 to 1,000,000 and the degree of polymerization for ethyleneimine repeating unit in the copolymer m is in a range of 0 to 500,000 at the same time. Preferably, n is in a range of 500 to 250,000 and m is in a range of 20 to 10,000, and most preferably n is in a range of 2500 to 100,000 and m is in a range of 50 to 5,000.

Alternatively, the nitrogen in the ethyleneimine repeating unit could be further quaternized to generate the following cationic copolymer:

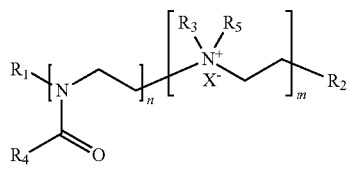

Any quaternization technique that is familiar to those skilled in the art could be used to quaternize the polymer of this example. $R_1$, $R_2$, $R_3$ and $R_4$ have the same meaning as those designated in the above oxazoline-ethyleneimine copolymer. $R_5$ includes, but is not limited to, a hydrogen, methyl, ethyl, propyl, or other types of alkyl group. The corresponding anion $X^-$ is a halogen, sulfonate, sulfate, phosphonate, phosphate, carbonate/bicarbonate, hydroxy, or carboxylate.

The ranges for n and m are also the same as those described in oxazoline-ethyleneimine copolymer.

Another example of B that can be used for the present invention is polydiallyldimethylammonium chloride. Polyethyloxazoline modified with polydiallyldimethylammonium chloride has the following structure:

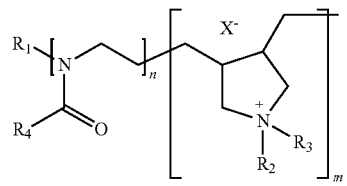

wherein $R_1$ and $R_4$ have the same meaning as described in previous example for quaternized oxazoline-ethyleneimine copolymer.

$R_2$ and $R_3$, independently, include, but are not limited to, short chain alkyl groups such as $C_1$ to $C_6$. The corresponding anion $X^-$ is a halogen, sulfonate, sulfate, phosphonate, phosphate, carbonate/bicarbonate, hydroxy, or carboxylate.

n and m are defined and numbered the same as in previous examples.

B could be other olefins including, but not limited to, diallyldimethylammonium chloride, styrene, methoxystyrene, and methoxyethene. Ethyloxazoline can also be copolymerized with heterocyclic monomers such as oxirane, thietane, 1,3-dioxepane, oxetan-2-one, and tetrahydrofuran to enhance the performance of the polymer for the present invention. The binder used in this invention could also employ pendant oxazoline groups on a polymer backbone, such as an acrylic or styrene based polymer, or a copolymer containing acrylic or styrene.

Examples of commercially available polyethyloxazolines include, but are not limited to, Aquazol 500 from Polymer Chemistry Innovations, Inc.

The amount of polymer binder that can be used in the liquid formulation can vary somewhat depending upon desired length of residual activity of the composition and the nature of all the other components in the composition. Preferably, the amount of polymer binder in the liquid formulation is in a range of 0.1% to 20% based on the weight of liquid formulation. In a liquid formulation for healthcare applications, the amount of polymer binder in the liquid formulation is more preferably in a range of 0.5% to 10%, and most preferably in a range of 0.8% to 5%. In liquid formulations for all-purpose and bathroom cleaners, the amount of polymer binder in the liquid formulation is more preferably in a range of 0.1% to 10%, and most preferably in a range of 0.1% to 5%.

The polymer binder preferably is water-soluble and can be readily removed from surface if any buildup is noticed. Present in small amounts, it nonetheless can provide a durable bond between biocidal compound and the treated surface to facilitate residual efficacy.

Biocidal Compound

The biocidal compound may be a quaternary ammonium compound (QAC) with the following molecular structure:

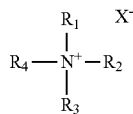

wherein $R_1$, $R_2$, $R_3$, and $R_4$ are independently selected and include, but are not limited to, alkyl, alkoxy, or aryl, either with or without heteroatoms, or saturated or non-saturated. Some or all of the functional groups may be the same.

The corresponding anion $X^-$ includes, but is not limited to, a halogen, sulfonate, sulfate, phosphonate, phosphate, carbonate/bicarbonate, hydroxy, or carboxylate.

QACs include, but are not limited to, n-alkyl dimethyl benzyl ammonium chloride, di-n-octyl dimethyl ammonium chloride, dodecyl dimethyl ammonium chloride, n-alkyl dimethyl benzyl ammonium saccharinate, and 3-(trimethoxysilyl) propyldimethyloctadecyl ammonium chloride.

Combinations of monomeric QACs are preferred to be used for the invention. A specific example of QAC combination is N-alkyl dimethyl benzyl ammonium chloride (40%); N-octyl decyl dimethyl ammonium chloride (30%); di-n-decyl dimethyl ammonium chloride (15%); and di-n-dioctyl dimethyl ammonium chloride (15%). The percentage is the weight percentage of individual QAC based on the total weight of blended QACs composition.

Polymeric version of the QACs with the following structures can also be used for the invention.

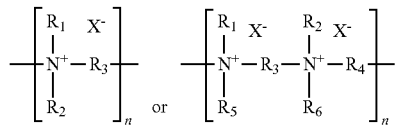

wherein $R_1$, $R_2$, $R_5$, and $R_6$, independently, include, but are not limited to, hydrogen, methyl, ethyl, propyl or other longer carbon alkyl groups.

$R_3$ and $R_4$ are independently selected and include, but are not limited to, methylene, ethylene, propylene or other longer alkylene linking groups.

n is the degree of polymerization; n is an integer in a range of from 2 to 10,000.

Examples of cationic polymers with the above structure, include but are not limited to, polyamines derived from dimethylamine and epichlorohydrin such as Superfloc C-572 commercially available from Kemira Chemicals.

Still another polymeric QAC suitable for the invention is poly diallyldimethylammonium chloride or polyDADMAC.

Yet another class of QACs useful for the present invention are those chemical compounds with biguanide moiety in the molecule. Examples of this class of cationic antimicrobials include, but are not limited to, PHMB and chlorhexidine.

Examples of commercially available quaternary ammonium compounds include, but are not limited to, Bardac 205M and 208M from Lonza, and BTC885 from Stepan Company.

The biocidal compound may be a weak acid, which has been shown to be particularly effective in bathroom cleaners.

In these type of products, citric, sulfamic (also known as amidosulfonic acid, amidosulfuric acid, aminosulfonic acid, and sulfamidic acid), glycolic, lactic, lauric and capric acids are useful as both an effective biocide and a cleaning agent for soap scum and hard wart deposits.

Other compounds which may be useful are silane quaternary salts such as 3(trihydroxysilyl)propyldimethyloctadecyl ammonium chloride. These may have the added benefit of reacting to the surface being treated for an enhancement of the residual properties.

Further biocidal compounds suitable for use in the present liquid formulation span a broad range of antimicrobials, biocides, sanitizers, and disinfectants. A water soluble or dispersible biocidal compound is preferred, although biocides soluble in alcohol may be alternatively employed.

A non-exhaustive list of biocidal compounds suitable for use in the present formulation include triclosan, zinc pyrithione, metal salts and oxides, phenols, botanicals, halogens, peroxides, heterocyclic antimicrobials, aldehydes, and alcohols.

The concentration of biocidal compound in the formulation can be in a range of 0.05% to 20% based on the weight of the liquid composition. For a liquid formulation for a healthcare application, preferably in a range of 0.1% to 20%, and more preferably in a range of 0.5% to 3%. For a liquid formulation for all-purpose and bathroom cleaners, preferably in a range of 0.05% to 10%. For a formulation for a protectant, preferably in a range of 0.05% to 2%.

Carrier

The carrier or media for the liquid formulation of this invention can be any solvent that is volatile and allow easy evaporation at ambient condition. Examples of liquid carriers include, but are not limited to, water and low molecular weight alcohols such as C1 to C8 alkanols. Specific examples include, but are not limited to, ethanol, isopropyl alcohol, butanol, pentanol, and combinations thereof.

Another class of solvents for use in the invention includes alkylene glycol ether. Examples include, but are not limited to, ethylene glycol monopropyl ether, ethylene glycol monobutyl ether, ethylene glycol monohexyl ether, ethylene glycol monohexyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, propylene glycol methyl ether, propylene glycol methyl ether acetate, propylene glycol n-butyl ether, dipropylene glycol n-butyl ether, dipropylene glycol methyl ether, dipropylene glycol methyl ether acetate, propylene glycol n-propyl ether, dipropylene glycol n-propyl ether, and tripropylene glycol methyl ether.

Another class of solvents for use in the invention is based on terpenes and their derivatives such as terpene alcohols, terpene esters, terpene ethers, or terpene aldehydes. Examples of solvents, include but are not limited to, pine oil, lemon oil, limonene, pinene, cymene, myrcene, fenchone, borneol, nopol, cineole, ionone and the like.

A preferred carrier in a liquid formulation for a home care cleaning application is water.

If the method of the application of the liquid formulation of the present invention is pressurized aerosol, a propellant may be needed in the composition. A variety of propellants or mixtures can be used for the present invention and should be familiar to those skilled in the art. C1 to C10 hydrocarbons or halogenated hydrocarbons are typical propellants in aerosol compositions known to the industry. Examples of such propellants include, but are not limited to, pentane, butane, propane, and methane. Other types of propellants that can be used for the present invention also include compressed air, nitrogen, or carbon dioxide. Alternatively, a bag on valve package may be used to aerosol the product without directly add a propellant to the composition.

Either a single solvent or a mixture of the above solvents can be used for the present invention. The types of solvents used for the present invention may depend upon the intended uses of the residual disinfectant composition. For example, if the composition of the present invent is intended for home care use, cleaning the contaminated surfaces free of all types of dirt or soil may be of primary interest. Liquid carrier or media that assist and enhance the removal of soil may be formulation of the invention. For example, the residual disinfectant formulation or composition of the present invention may desire to include alkyl or multi-alkyl glycol ethers for better cleaning performance in the home care version of the formulation of the present invention. On the other hand, if the primary goal of the residual disinfectant composition is to be used at a health care facility where the major concern is hospital acquired infection, then quick drying of the liquid composition of the present invention may be more desirable than cleaning dirt or soil out of the surfaces. Low molecular weight alcohols should be considered to help the liquid formulation of the present invent dry fast after the application. Also, a low molecular weight alcohol in the liquid formulation will strengthen the sanitizing activity of the liquid composition.

For health care use of the residual disinfectant, a mixture of water and low molecular weight alcohol is preferred. The amount of alcohol present in the liquid formulation is preferred to be at such a level that the liquid formulation is capable of forming a zerotropic mixture between the alcohol and water. A minimum amount of alcohol, if present, in the liquid composition is 10%. Preferably, for health care use of the residual disinfectant, the alcohol concentration is 30%, and most preferably the alcohol concentration is at least 50% based on the weight of liquid formulation for the health care use of the composition of the invention.

Surfactant

A surfactant or wetting agent may be employed. The surfactant assists the liquid formulation to spread and evenly coat the surface being treated. The surfactant additionally contributes to the formation of a zeotropic mixture between alcohol and water, thus facilitating a rapid and uniform drying of the liquid formulation once being applied onto surface. A surfactant also plays an important role in the residual disinfectant liquid formulation of the present invention for home care use if the soil cleaning performance is the key feature the product is designed to possess.

Surfactants appropriate for the present liquid formulation include, but are not limited to, those that are nonionic, anionic, or amphoteric in nature. Examples of commercially available wetting agents include, but are not limited to, Ecosurf SA-4 or Tergitol TMN-3 from Dow Chemical, and Q2-5211 from Dow Corning.

An amine oxide surfactant is preferred especially when the QAC is used as the biocidal compound in the formulation.

In the category of nonionic surfactants, ethoxylated alcohols with different amounts of ethylene oxides or HLB values can be used. Examples of ethoxylated alcohols include, but are not limited to, Triton X-100 (Dow Chemical, Midland Mich.), Ecosurf EH nonionic surfactant series from Dow Chemical, Tergitol nonionic surfactant series from Dow Chemical, the Surfonic surfactant series from Huntsman Corp., the Neodol surfactant series from Shell, the Ethox surfactant series from Ethox Chemicals and the Tomadol surfactant series from Air Products and Chemicals, Inc.

Another class of nonionic surfactants include alkylpolyglucosides. Examples include the Glucopon Series from BASF and the Ecoteric series from Huntsman.

An alternative class of surfactants that is preferred for the liquid formulation are silane-based surfactants. Examples include but, are not limited to, silicone polyethers organofunctional or reactive silane wetting agents, and fluorochemical based wetting agents.

The content of the surfactant in the liquid formulation is in a range of 0% to 10%, preferably in a range of 0.01% to 5%.

Depending on the targeted uses, a liquid formulation of the present invention for home care use may need appropriate pH condition. For example, if the liquid product is used in the kitchen area, a high pH product may be desired in order to effectively remove grease soils commonly found in the area. If the product is used in bathroom area, soap scum and hard water deposits may be the primary concern. In such case, a low pH product may be more appropriate for such a purpose. There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, potassium hydroxide, potassium carbonate, calcium carbonate, citric acid, acetic acid, hydrochloric acid, sulfamic acid, sulfuric acid and the like.

Other than components mentioned above, additional functional components may be included in the liquid composition of the present invention. Additional components include, but are not limited to, chelants, compatibilizers, coupling agents, corrosion inhibitors, rheology modifiers, fragrances, colorants, preservatives, UV stabilizers, optical brighteners, and active ingredient indicators.

In an embodiment of the present invention, the liquid solution comprises a polymer binder, a quaternary ammonium compound, a silicone-based surfactant, and ethanol. The liquid formulation can be made or mixed by any conventional method known to one of ordinary skill in the art. There are no preferred addition procedures for the formulation of the present invention provided that the formulation is ultimately homogeneous, compatible and stable. For example, if the polymer binder is a solid, it may be preferable to first dissolve or disperse the polymer in a carrier such as water or alcohol to make a stock polymer binder liquid dispersion. The stock polymer binder liquid dispersion may be readily added into the formulation of the present invention during the mixing procedure.

Application of Liquid Formulation

The liquid formulation may be applied by a variety of means. If sprayed, the liquid formulation advantageously may be supplied in a conventional bottle with a sprayer. The sprayer can be a trigger sprayer. As an option to a trigger sprayer, an aerosol can also be used to deliver the liquid formulation on to surfaces. Additional application means include, but are not limited to, fogging, rolling, brushing, mopping, and using a wipe by a variety of application devices. It is within the scope of the present invention that wipe products can also be made comprising or pre-treated with the disinfectant formulation(s) of the present invention, for example, for off-the-shelf sale or use.

In an embodiment of the invention, a wipe is provided having up to 24-hour residual sanitization activity. The wipe is capable of protecting a hard surface from microbial growth and protection against bacteria without leaving a significant residue or build-up.

In an embodiment of the invention, the wipe is comprised of a substrate and a formulation applied on the substrate or present in the substrate of the wipe.

The wipe formulation provides a solid transparent film water soluble enough to be easily removed with additional cleanings yet durable enough to remain on the surface even after being touched.

The substrate is any fibrous material capable of absorbing and/or adsorbing water, preferably at least three times its weight in water. The substrate comprises a synthetic material, a natural material, or a combination thereof. Examples of synthetic materials include, but are not limited to, polypropylene, polystyrene, polyester, nylon, rayon, acrylic, spandex, and a combination thereof. Examples of natural materials include, but are not limited to, cotton, linen, silk, wool, hemp, flax, and a combination thereof.

The substrate may be woven or non-woven. A non-woven substrate may be made by any number of manufacturing methods. The resulting non-woven substrate may be, but is not limited to, melt-blown, coformed, spunbonded, airlaid, hydroentangled, spunlaced, bonded, carded, laminated, or a combination thereof. For example, a substrate may comprise a melt-blown polymeric material.

In an embodiment of the invention, the wipe formulation comprises a biocidal compound, a polymer binder and a wetting agent/surfactant.

For a substrate comprising a natural material, the wipe formulation may comprise a cationic containing compound that is designed to compete with the quaternary ammonium compound(s) for anionic species sites on the substrate. Salts with high ionic strengths can also be used. Examples of salts for use in the wipe formulation include, but are not limited to, potassium citrate, sodium citrate, magnesium sulphate, sodium chloride, ammonium chloride, potassium chloride, and a combination thereof.

The wipe formulation provides initial disinfection then once dried leaves a residual protective film on the surface. The film possesses biocidal properties with the ability to kill bacteria, for example, within a 5-minute contact time for up to 24 hours after initial application.

In a preferred embodiment, the wipe formulation comprises a poly(2-ethyl-2-oxazoline), a quaternary ammonium compound or combination of quaternary ammonium compounds, an alcohol ethoxylate, water, and an optional fragrance.

Quaternary ammonium compounds (QAC) are especially suited for this wipe application as they provide protection against a broad range of microorganisms. Examples of such compounds are commercially available from Stepan Chemical under the trade name BTC885. BTC885 contains 50% of a blend of quaternary ammonium compounds. A similar material is also commercially available from Lonza under the trade name Bardac 205M.

Preferably, the quaternary ammonium compound and the binder are in a ratio of quaternary ammonium compound to binder of 1:4 to 1:1.

Preferably, the wipe formulation comprises a poly(2-ethyl-2-oxazoline) in an amount of 1 weight % to 5 weight %, wherein the weight percentage is based on the total weight of the wipe formulation.

Preferably, the wipe formulation comprises a quaternary ammonium compound in an amount of at least 0.2 weight percent, preferably 0.2 weight percent to 2 weight percent, wherein the weight percentage is based on the total weight of the wipe formulation.

Preferably, the wipe formulation comprises a nonionic surfactant.

In an embodiment of the invention, the nonionic surfactant is an alcohol ethoxylate. Preferably, the wipe formulation comprises the alcohol ethoxylate in an amount of 0.05 weight % to 0.5 weight %, wherein the weight percentage is based on the total weight of the wipe formulation. A preferred alcohol ethoxylate is a linear alcohol ethoxylate with at least 9 moles of ethylene oxide, more preferably with at least 12 moles of ethylene oxide. It is unexpected that an alcohol ethoxylate, such as in this group, when used in the formulation of the present invention surprisingly and favorably contributes to the aesthetics of the resulting film by drying to a hard transparent film (as opposed to a tacky, hazy film) yet remains water soluble enough to allow release of the quaternary ammonium compound(s) for antimicrobial efficacy.

A weak acid including, but not limited to, citric acid, lactic acid, sulfamic, acid, glycolic acid, or a combination thereof can be added to the formulation to increase efficacy against gram negative bacteria and aid in hard water stain or soap scum soil removal.

Ethylenediaminetetraacetic acid, disodium salt or EDTA disodium salt can be added to the formulation to increase antimicrobial efficacy in the presence of hard water.

The wipe formulation optionally comprises a fragrance. If a fragrance is present, the wipe formulation preferably comprises a fragrance in an amount of 0 weight % to 0.5 weight %, wherein the weight percentage is based on the total weight of the wipe formulation.

Water is a suitable carrier for inert and active materials. Solvents such as ethanol or isopropanol are optionally added to decrease drying time.

The wipe formulation of the present invention is effective for the above purposes without requiring other components to be present in the formulation, although other components may be present. For example, the wipe formulation of the present invention is effective for its residual sanitization activity without hydrogen peroxide as a component of the formulation.

To disinfect a contaminated surface, spray the liquid formulation until the area is completely covered. The wet formulation subsequently may be wiped dry with a dry cloth or paper towel.

The invention also relates to an article treated with a disinfectant formulation in accordance with aspects of the invention.

Examples

The following examples illustrate liquid formulations made in accordance with aspects of the present invention. The testing results on these formulations demonstrate the desired residual sanitizing or disinfecting performance once being applied onto surfaces and dried. Cleaning performance is also tested on those formulations that not only provide residual disinfecting benefit but also cleaning features.

Formulations were tested for residual efficacy using the EPA 01-1A protocol. Briefly, bacteria were added to a glass slide and allowed to dry on the surface. The formulation was then sprayed onto the surface and dried to form a transparent film. Once a film had formed, the glass slide was exposed to alternating wet and dry cycles using the Gardner wear tester as described in the protocol. In between each cycle the slide was re-inoculated with bacteria. After the appropriate number of wear and re-inoculations (48 passes and 11 re-inoculations for healthcare formulation and 24 passes 5 re-inoculation for homecare formulation) the slide was exposed to bacteria for the indicated time frame (i.e. 5 minutes) followed by recovery in an appropriate neutralizing solution.

In addition to residual efficacy, initial efficacy of the composition of the present invention was also tested according to ASTM E 1153.

A modified ASTM D4488 was used to evaluate the hard surface cleaning performance for the home care composition of the present invention. A soil of the following composition was used for the evaluation.

TABLE 1

| Components | Weight percentage of each component (%) |
|---|---|
| Pure vegetable oil | 75 |
| TM-122 AATCC carpet soil | 25 |

*TM-122 AATCC carpet soil was obtained from Textile Innovators

In the process of making a soiled ceramic tile for the cleaning test, around 2 grams of the liquid soil was placed on an aluminum foil. A roller was used to roll and spread out the soil on the foil and let the roller pick up the soil as much as possible. The soil on the roller was transferred to the glazed surface of a ceramic tile evenly by rolling the soiled roll on the ceramic surface. The soiled ceramic tile was then baked in oven set at 180° C. for 45 minutes. The baked tile was conditioned at room temperature for 24 hours before being used for the cleaning test.

A Gardner wear tester was used in the cleaning test. Scouring pads of around 1 cm width were attached to the abrasion boat for the wearing. Around 4 grams of test formulation was placed in a weighing boat. The attached scouring pad was dipped into the weighing boat to pick up the testing formulation.

The cleaning process started immediately after the pad is wetted with the cleaning formulation. Seven wearing cycles (back and forth) were used in the test.

Residual Disinfectant Examples for Healthcare

The following formulation in the example uses alcohol as the major carrier in order to provide fast drying property to the liquid formulations.

TABLE 2

| Components | HE1 (wt %) | HE2 (wt %) | HE3 (wt %) |
|---|---|---|---|
| Water | balance | balance | balance |
| Ethanol | 70 | 70 | 0 |
| 2-Propanol | 0 | 0 | 70 |
| Polyethyloxazoline | 2 | 2 | 2 |
| Quaternary ammonium compound | 0.8 | 1.2 | 1.2 |
| Wetting agent/Surfactant | 0.1 | 0.1 | 0.1 |

The residual efficacy testing was conducted using EP01-1A protocol and the results are listed in the following Table.

TABLE 3

| Formulation | EP01-1A (average log reduction bacterial) |
|---|---|
| HE1 | 3.53 |
| HE2 | 5.50 |
| HE3 | 4.50 |

These formulations show excellent residual efficacy result based on EP01-1A test.

The ASTM E 1153 test protocol was also followed to assess the initial biocidal property of HE2. Test results are presented in the following table.

TABLE 4

| | | Method | |
|---|---|---|---|
| Initial Efficacy | Time 3 log reduction | Complete kill (<10 CFU/PFU) | |
| Bacterial | | | |
| Klebsiella pneumoniae | 30 seconds | 1 minute | ASTM E 1153 |
| Pseudomonas aerugniosa | 30 seconds | 30 seconds | ASTM E 1153 |
| Staphylococcus aureus | 30 seconds | 30 seconds | ASTM E 1153 |
| MRSA | 30 seconds | 30 seconds | ASTM E 1153 |
| VRE | 30 seconds | 30 seconds | ASTM E 1153 |
| Enterobacter aerogenes | 30 seconds | 30 seconds | ASTM E 1153 |
| Enterococcus faecalis | 30 seconds | 1 minute | ASTM E 1153 |
| Fungal | | | |
| Aspergillus niger | 1 minute | 5 minutes | ASTM E 1153 |
| Tricophyton mentagrophytes | 1 minute | 5 minutes | ASTM E 1153 |
| Viral | | | |
| H1N1 (envelope) | 30 seconds | 30 seconds | ASTM E 1053 |
| MS2 (Non-enveloped) | 30 seconds | 5 minutes | ASTM E 1053 |
| Residual Efficacy | Time frame of exposure | Log reduction | Method |
| Pseudomonas aerugniosa | 5 minutes | >3 | EPA 01-1A |
| Enterobacter aerogenes | 5 minutes | >3 | EPA 01-1A |
| Staphylococcus aureus | 5 minutes | >3 | EPA 01-1A |

These data clearly demonstrate that sample surfaces treated with the exemplary liquid formulation disclosed herein possess a demonstrable biocidal activity at the indicated time frame.

Residual Disinfectant Cleaner Examples for Homecare

These compositions are formulated using water as the carrier. They are intended for homecare use where VOC regulations prohibit most use of high levels of organic solvents such as alcohols.

TABLE 5

| Components | H1 (wt %) | H2 (wt %) | H3 (wt %) | H4 (wt %) | H5 (wt %) |
|---|---|---|---|---|---|
| Water | balance | balance | balance | balance | balance |
| EDTA tetra sodium | 0 | 0 | 0 | 0 | 0.4 |
| Polyethyloxazoline | 1 | 1 | 1 | 0.5 | 0.5 |
| Ethoxylated alcohol #1 | 0.33 | 0 | 0 | 0 | 0 |
| Ethoxylated alcohol #2 | 0 | 0 | 0.2 | 0.2 | 0.2 |

TABLE 5-continued

| Components | H1 (wt %) | H2 (wt %) | H3 (wt %) | H4 (wt %) | H5 (wt %) |
|---|---|---|---|---|---|
| Quaternary ammonium compound | 0.4 | 0.4 | 0.4 | 0.4 | 0.4 |
| Ethanolamine | 0.2 | 0.2 | 0.2 | 0.2 | 0.2 |
| Wetting Agent | 0.1 | 0.1 | 0.1 | 0.1 | 0.1 |

The residual efficacy of these formulations were assessed using EP01-1A protocol and the results are listed in the following Table.

TABLE 6

| Formulation | EP01-1A (average log reduction bacterial) |
|---|---|
| H1 | 3.53 |
| H2 | 5.50 |
| H3 | 5.50 |
| H4 | 4.90 |
| H5 | 3.80 |

*Enterobacter aerogenes* was the bacterial for H1 testing and *Staphylococcus aureus* was the bacteria used in the testing for the rest of the formulations.

The testing results demonstrate that the H1 to H5 all provide residual efficacy to the treated surfaces. The cleaning performance was also evaluated using the modified ASTM D4488 test method.

The testing results also clearly visually showed the formulation of present invention not only provided residual efficacy against bacterial but also good cleaning performance on soiled surfaces.

Additional formulations set forth in the Tables below were tested for home care and home cleaning applications. To solubilize the fragrance, a pre-mix is prepared containing the fragrance, quaternary ammonium compound, surfactant and glycol ether if present.

TABLE 7

Light Duty Protectant Formulations

| Component | P1 (wt %) | P2 (wt %) | P3 (wt %) | P4 (wt %) | P5 (wt %) | P6 (wt %) | P7 (wt %) | P8 (wt %) | P9 (wt %) | P10 (wt %) | P11 (wt %) | P12 (wt %) | P13 (wt %) | P14 (wt %) | P15 (wt %) |
|---|---|---|---|---|---|---|---|---|---|---|---|---|---|---|---|
| Polyethyloxazoline | 1.00 | 1.00 | 1.00 | 1.00 | 1.00 | 1.00 | 1.00 | 1.00 | 1.00 | 1.00 | 0.50 | 1.00 | 0.50 | 1.00 | 0.50 |
| Quaternary ammonium compound | 0.40 | 0.40 | 0.40 | 0.40 | 0.40 | 0.40 | 0.40 | 0.40 | 0.40 | 0.40 | 0.40 | 0.20 | 0.20 | 0.10 | 0.10 |
| Fragrance | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Wetting agent | 0.30 | | | | | | | | | 0.10 | 0.10 | 0.10 | 0.10 | 0.10 | 0.10 |
| Amine Oxide | | 0.30 | | | | 0.30 | 0.30 | 0.30 | 0.30 | | | | | | |
| Ethoxylated Cationic surfactant | | | 0.30 | | | | | | | | | | | | |
| Dicoco quat | | | | 0.30 | | | | | | | | | | | |
| Ethoxylated alcohol | | | | | 0.30 | | | | | | | | | | |
| Triethanolamine | | | | | | 0.50 | | | | 0.50 | 0.50 | 0.50 | 0.50 | 0.50 | 0.50 |
| NaEDTA | | | | | | | 0.10 | | | | | | | | |
| Sodium metasilicate pentahydrate | | | | | | | | 0.10 | | | | | | | |
| Sodium Carbonate | | | | | | | | | 0.10 | | | | | | |
| Water* | B | B | B | B | B | B | B | B | B | B | B | B | B | B | B |

| Component | P16 (wt %) | P17 (wt %) | P18 (wt %) | P19 (wt %) | P20 (wt %) | P21 (wt %) | P22 (wt %) | P23 (wt %) | P24 (wt %) | P25 (wt %) | P26 (wt %) | P27 (wt %) | P28 (wt %) | P29 (wt %) |
|---|---|---|---|---|---|---|---|---|---|---|---|---|---|---|
| Polyethyloxazoline | 1.00 | 0.50 | 1.00 | 0.50 | 1.00 | 0.50 | 1.00 | 0.50 | 1.00 | 1.00 | 1.00 | 0.50 | 0.50 | 0.50 |
| Quaternary ammonium compound | 0.20 | 0.20 | 0.10 | 0.10 | 0.20 | 0.20 | 0.10 | 0.10 | 0.20 | 0.20 | 0.20 | 0.20 | 0.20 | 0.20 |
| Fragrance | 0.05 | 0.05 | 0.05 | 0.05 | 0.05 | 0.05 | 0.05 | 0.05 | 0.05 | 0.05 | 0.05 | 0.05 | 0.05 | 0.05 |
| Wetting agent | | | | | | | | | | | | | | |
| Amine Oxide | 0.30 | 0.30 | 0.30 | 0.30 | | | | | | | | | | |
| Ethoxylated Cationic surfactant | | | | | | | | | | | | | | |
| Dicoco quat | | | | | | | | | | | | | | |
| Ethoxylated alcohol | | | | | 0.20 | 0.20 | 0.20 | 0.20 | 0.20 | 0.20 | 0.20 | 0.20 | 0.20 | 0.20 |
| Triethanolamine | 0.50 | 0.50 | 0.50 | 0.50 | 0.50 | 0.50 | 0.50 | 0.50 | | | | | | |
| NaEDTA | | | | | | | | | | 0.10 | | 0.10 | | |

TABLE 7-continued

Light Duty Protectant Formulations

| Sodium metasilicate pentahydrate | | | | | | | | | | 0.10 | | 0.10 | | |
| Sodium Carbonate | | | | | | | | | | | 0.10 | | 0.10 | |
| Water* | B | B | B | B | B | B | B | B | B | B | B | B | B | B |

*B means balance water

TABLE 8

All Purpose Cleaner Formulations

| Component | A1 (wt %) | A2 (wt %) | A3 (wt %) | A4 (wt %) | A5 (wt %) | A6 (wt %) | A7 (wt %) | A8 (wt %) | A9 (wt %) | A10 (wt %) | A11 (wt %) | A12 (wt %) | A13 (wt %) | A14 (wt %) | A15 (wt %) | A16 (wt %) |
|---|---|---|---|---|---|---|---|---|---|---|---|---|---|---|---|---|
| Polyethyloxazoline | 1.00 | 1.00 | 1.00 | 1.00 | 1.00 | 1.00 | 1.00 | 1.00 | 1.00 | 1.00 | 1.00 | 1.20 | 1.00 | 1.20 | 1.00 | 1.0 |
| Quaternary ammonium compound | 0.40 | 0.40 | 0.40 | 0.40 | 0.40 | 0.40 | 0.40 | 0.40 | 0.40 | 0.40 | 0.50 | 0.50 | 0.40 | 0.80 | 0.40 | 0.80 |
| Fragrance | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Amine Oxide | | 0.90 | 0.90 | 0.90 | 0.90 | 0.90 | 0.90 | 0.90 | 0.60 | 0.45 | 0.45 | 0.60 | 0.60 | 0.60 | 0.45 | 0.60 |
| Ethoxylated Alcohol 1 | 0.50 | | | | | | | | | | | | | | | |
| Ethoxylated Alcohol 2 | | | | | | | | | | | | | | | | |
| Alkylpolyglucoside | | | | | | | | | | | | | | | | |
| Triethanolamine | | | | | | | | 1.0 | | | | | | | | |
| Glycol Ether 1 | | | | | | | | | | | | | | | 5.00 | |
| Glycol Ether 2 | | | | | | | | | | | | | | | | |
| NaEDTA | | | 0.40 | | | | | | | | | | | | | |
| Sodium metasilicate pentahydrate | | | | 0.10 | | | | | 0.25 | 0.25 | 0.25 | 0.10 | 0.10 | 0.10 | 0.10 | 0.10 |
| Sodium Carbonate | | | | | 0.10 | | | | | | | | | | | |
| STPP | | | | | | 0.10 | | | | | | | | | | |
| TKPP | | | | | | | 0.10 | | | | | | | | | |
| Water* | B | B | B | B | B | B | B | B | B | B | B | B | B | B | B | B |

| Component | A17 (wt %) | A18 (wt %) | A19 (wt %) | A20 (wt %) | A21 (wt %) | A22 (wt %) | A23 (wt %) | A24 (wt %) | A25 (wt %) | A26 (wt %) | A27 (wt %) | A28 (wt %) | A29 (wt %) | A30 (wt %) | A31 (wt %) | A32 (wt %) |
|---|---|---|---|---|---|---|---|---|---|---|---|---|---|---|---|---|
| Polyethyloxazoline | 0.80 | 0.80 | 1.0 | 1.00 | 1.20 | 1.00 | 1.00 | 1.00 | 1.00 | 1.00 | 1.00 | 1.00 | 1.00 | 1.00 | 1.00 | 1.00 |
| Quaternary ammonium compound | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Fragrance | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Amine Oxide | 0.60 | 0.60 | 1.50 | 1.20 | 0.60 | | | | | | | | | 0.60 | | |
| Ethoxylated Alcohol 1 | | | | | | | 0.10 | | 0.20 | | | 0.60 | 0.60 | | 0.80 | |
| Ethoxylated Alcohol 2 | | | | | | | | 0.10 | | 0.20 | 0.20 | | | | | 0.80 |
| Alkylpolyglucoside | | | | | | 0.60 | 0.50 | 0.50 | 0.40 | 0.40 | 0.40 | | | | | |
| Triethanolamine | | | 0.50 | | | | | | | 0.50 | 0.50 | 0.50 | 0.50 | 0.50 | 0.50 | |
| Glycol Ether 1 | | 5.00 | | | | | | | | | | 2.40 | | | 2.40 | |
| Glycol Ether 2 | | | | | | | | | | | | | 2.40 | 2.40 | | 2.40 |
| NaEDTA | | | | | | | | | | | | | | | | |
| Sodium metasilicate pentahydrate | 0.10 | | | | | 0.05 | 0.05 | 0.05 | 0.05 | 0.05 | | | | | | |
| Sodium Carbonate | | | | | | | | | | | | | | | | |
| STPP | | | | | | | | | | | | | | | | |
| TKPP | | | | | | | | | | | | | | | | |
| Water* | B | B | B | B | B | B | B | B | B | B | B | B | B | B | B | B |

TABLE 9

Bathroom Cleaner Formulations

| Component | B1 (wt %) | B2 (wt %) | B3 (wt %) | B4 (wt %) | B5 (wt %) | B6 (wt %) | B7 (wt %) | B8 (wt %) | B9 (wt %) | B10 (wt %) | B11 (wt %) | B12 (wt %) |
|---|---|---|---|---|---|---|---|---|---|---|---|---|
| Polyethyloxazoline | 1.00 | 1.00 | 1.00 | 1.00 | 1.00 | 1.00 | 1.00 | 1.00 | 1.00 | 1.00 | 1.00 | 1.00 |
| Quaternary ammonium compound | 0.20 | 0.20 | 0.20 | 0.20 | 0.20 | 0.20 | 0.20 | 0.20 | 0.20 | 0.20 | 0.20 | 0.20 |
| Fragrance | 0.10 | 0.10 | 0.10 | 0.10 | 0.10 | 0.10 | 0.10 | 0.10 | 0.10 | 0.10 | 0.10 | 0.10 |
| Amine Oxide | 0.84 | | 0.42 | 0.84 | | 0.42 | 0.84 | | 0.42 | 0.84 | | 0.42 |
| Ethoxylated alcohol 1 | | 0.84 | | | 0.84 | | | 0.84 | | | 0.84 | |
| Ethoxylated alcohol 2 | | | 0.50 | | | 0.50 | | | 0.50 | | | 0.50 |
| Glycol Ether | | | | 4.00 | 4.00 | 4.00 | | | | 4.00 | 4.00 | 4.00 |
| NaEDTA | 2.90 | 2.90 | 2.90 | 2.90 | 2.90 | 2.90 | | | | | | |
| Citric Acid | | | | | | | 2.50 | 2.50 | 2.50 | 2.50 | 2.50 | 2.50 |
| Sulfamic Acid | | | | | | | | | | | | |
| Water* | B | B | B | B | B | B | B | B | B | B | B | B |

| Component | B13 (wt %) | B14 (wt %) | B15 (wt %) | B16 (wt %) | B17 (wt %) | B18 (wt %) | B19 (wt %) | B20 (wt %) | B21 (wt %) | B22 (wt %) | B23 (wt %) | B24 (wt %) |
|---|---|---|---|---|---|---|---|---|---|---|---|---|
| Polyethyloxazoline | 1.00 | 1.00 | 1.00 | 1.00 | 1.00 | 1.00 | 1.00 | 1.00 | 1.00 | 1.00 | 1.00 | 1.00 |
| Quaternary ammonium compound | 0.20 | 0.20 | 0.20 | 0.80 | 0.80 | 0.80 | 0.80 | 0.80 | 0.80 | 0.80 | 0.80 | 0.80 |
| Fragrance | 0.10 | 0.10 | 0.10 | 0.10 | 0.10 | 0.10 | 0.10 | 0.10 | 0.10 | 0.10 | 0.10 | 0.10 |
| Amine Oxide | 0.84 | | 0.42 | 0.80 | | 0.40 | 0.80 | | 0.40 | 0.80 | | 0.40 |
| Ethoxylated alcohol 1 | | 0.84 | | | 0.80 | | | 0.80 | | | 0.80 | |
| Ethoxylated alcohol 2 | | | 0.50 | | | 0.50 | | | 0.50 | | | 0.50 |
| Glycol Ether | 4.00 | 4.00 | 4.00 | | | | | | 4.0 | 4.0 | 4.0 | 4.0 |
| NaEDTA | | | | | | | | | | | | |
| Citric Acid | | | | 2.50 | 2.50 | 2.50 | 2.50 | 2.50 | 2.50 | | | |
| Sulfamic Acid | 2.50 | 2.50 | 2.50 | | | | | | | 2.50 | 2.50 | 2.50 |
| Water* | B | B | B | B | B | B | B | B | B | B | B | B |

A concentrate of a water based formulation is prepared by removing a portion of the water from the formulation, concentrating the remaining raw materials. The resulting concentrate can then be diluted back to use strength prior to use. The 5 times and 10 times concentrates are typically used in the janitorial and sanitization supply industries with customers in the hospitality area. Concentrates can be prepared at 15 times, 20 times, or even higher levels, as desired, and still be within the scope of the present invention. Concentrates are desirable in these industries as it reduces shipping costs and conserves storage space. Table 10 illustrates example concentrate formulations in an embodiment of the invention.

TABLE 10

Concentrate Formulations

| Component | Protectant 5× | Protectant 10× | Protectant 20× | All Purpose Cleaner 5× | All Purpose Cleaner 10× | All Purpose Cleaner 20× | Bathroom Cleaner 5× | Bathroom Cleaner 10× | Bathroom Cleaner 20× |
|---|---|---|---|---|---|---|---|---|---|
| Polyethyloxazoline | 5.0 | 10 | 20 | 5.0 | 10 | 20 | 5.0 | 10 | 20 |
| Quaternary ammonium compound | 1.0 | 2.0 | 4 | 2.5 | 5.0 | 10 | 1.6 | 3.2 | 6.4 |
| Fragrance | 0.25 | 0.50 | 1.0 | 0.5 | 1.0 | 2.0 | 0.75 | 1.5 | 3.0 |
| Surfactant | 0.50 | 1.0 | 2.0 | 4.0 | 8.0 | 16 | 3.0 | 6.0 | 12 |
| Glycol Ether | | | | 12.5 | 25 | 50 | | | |
| TEA | 2.5 | 5.0 | 10 | | | | | | |
| Citric Acid | | | | | | | 12.5 | 25 | 50 |
| Water* | B | B | B | B | B | B | B | B | B |

Comparative Example

Multiple polymeric compounds were tested for the capability to provide persistent bioburden reduction utilizing the EPA 01-1A protocol against *Enterobacter aerogenes*. 50 microL of each formulation was allowed to dry on glass carriers before being subjected to the test. Each test was conducted in the presence of 5% FBS. As noted in Table 11, the combination of polyoxazoline and quaternary ammonium provided a synergistic residual sanitizing benefit.

TABLE 11

|  | Formula 1 | Formula 2 | Formula 3 | Formula 4 | Formula 5 |
|---|---|---|---|---|---|
| Active Ingredient | Quaternary Ammonium Blend | Quaternary Ammonium blend | Quaternary Ammonium blend | Quaternary Ammonium blend | Quaternary Ammonium blend |
| Polymer | 3 Glycidoxypropyl-trimethoxysilane | Trimethoxysilyl-propyl (Polyethyleneimine) SSP-060 | acrylic emulsion | polyamide resin | polyoxazoline |
| Aesthetics | hazy film | tacky film when dry | clear, non-tacky film | clear, non-tacky film | clear, non-tacky film |
| Associated Log Reduction | NT* | NT* | 0.5 log reduction | 1.8 log reduction | 5 log reduction |

*indicates not tested (NT) due to poor aesthetics

Example—Wipe Formulation

Wipe formulations A-I were prepared and tested on various substrates.

In the tests for Formulations A-F, 8 grams of formulation was added to a 7"×8", 100% PP, 34 gram per square meter substrate. The substrate, which was obtained from Rockline Industries, was a Kimberly Clark melt blown product. The results are shown in Table 12 below.

TABLE 12

|  | A (wt %) | B (wt %) | C (wt %) | D (wt %) | E (wt %) | F (wt %) |
|---|---|---|---|---|---|---|
| Aquazol 500 | 1.50 | 1.50 | 1.50 | 0.60 | 0.90 | 1.20 |
| BTC 885 (50% Active) | 0.45 | 0.90 | 1.43 | 1.00 | 1.00 | 1.00 |
| Tomadol 25-12 | 0.20 | 0.20 | 0.20 | 0.20 | 0.20 | 0.20 |
| Fragrance | 0.10 | 0.10 | 0.10 | 0.10 | 0.10 | 0.10 |
| Water | balance | balance | balance | balance | balance | balance |
| Log Reduction* | 2.4 | 3.9 | 4.7 | <0.5 | 2.8 | 3.2 |
| Result* | Fail | Pass | Pass | Fail | Fail | Pass |

*Clorox method 01-1A results - The method was adapted to wipes by folding the substrate lengthwise into 1" folds then wrapping the folded substrate strip across the second, third and fourth fingers. One pass was made across the glass carriers. A log reduction greater than 3.0 was required to be considered passing.

In each of the tests for Formulations G and H, 11 grams of a formulation was added to a 7"×8" 100% polyester substrate from US Nonwovens (Item # XNW-8045). The results are shown in Table 13 below.

TABLE 13

|  | G (wt %) | H (wt %) |
|---|---|---|
| Aquazol 500 | 1.50 | 1.50 |
| BTC 885 (50% Active) | 1.00 | 1.40 |
| Tomadol 25-12 | 0.20 | 0.20 |
| Fragrance | 0.10 | 0.10 |
| Water | balance | balance |
| Log Reduction* | 2.2 | 4.1 |
| Result* | Fail | Pass |

*Clorox method 01-1A results - The method was adapted to wipes by folding the substrate lengthwise into 1" folds then wrapping the folded substrate strip across the second, third and fourth fingers. One pass was made across the glass carriers. A log reduction greater than 3.0 was required to be considered passing.

In tests for Formulation I, 8 grams of the formulation was added to a 7"×8", 100% polypropylene (PP), 35 grams per square meter substrate. The substrate was from Diamond wipes (Item # P50535). The results are shown in Table 14 below.

TABLE 14

|  | I (wt %) |
|---|---|
| Aquazol 500 | 1.50 |
| BTC 885 (50% Active) | 0.90 |
| Tomadol 25-12 | 0.20 |
| Fragrance | 0.10 |
| Water | balance |
| Log Reduction* | 4.3 |
| Result* | Pass |

*Clorox method 01-1A results - The method was adapted to wipes by folding the substrate lengthwise into 1" folds then wrapping the folded substrate strip across the second, third and fourth fingers. One pass was made across the glass carriers. A log reduction greater than 3.0 was required to be considered passing.

It will therefore be readily understood by those persons skilled in the art that the present composition and methods are susceptible of broad utility and application. Many embodiments and adaptations other than those herein described, as well as many variations, modifications and equivalent arrangements, will be apparent from or reasonably suggested to one of ordinary skill by the present disclosure and the foregoing description thereof, without departing from the substance or scope thereof.

Accordingly, while the present composition and methods have been described herein in detail in relation to its preferred embodiment, it is to be understood that this disclosure is only illustrative and exemplary and is made merely for purposes of providing a full and enabling disclosure.

The foregoing disclosure is not intended or to be construed to limit or otherwise to exclude any such other embodiments, adaptations, variations, modifications and equivalent arrangements.

What is claimed is:

1. A wipe having a residual biocidal property, the wipe comprising:
   a woven or non-woven substrate comprised of a fibrous material, and
   a disinfectant formulation present on or in the substrate;
   wherein the disinfectant formulation comprises:
      an oxazoline homopolymer having a structure of

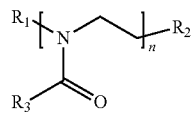

wherein
      $R_1$ is hydroxyl,
      $R_2$ is hydroxyl,
      $R_3$ is alkyl,
      n is in a range of 1 to 1,000,000;
      a quaternary ammonium compound or combination of quaternary ammonium compounds;
      a surfactant;
      water; and
      an optional fragrance;
   wherein the oxazoline homopolymer is present in an amount of 0.2% to 3% by weight and the quaternary ammonium compound or combination of quaternary ammonium compounds is present in an amount of 0.05% to 20% by weight based on the weight of the disinfectant formulation.

2. The wipe according to claim 1, wherein the substrate is water absorbent, water adsorbent, or both.

3. The wipe according to claim 1, wherein the substrate is comprised of a material selected from the group consisting of a natural material, a synthetic material, and a combination thereof.

4. The wipe according to claim 3, wherein the natural material is selected from the group consisting of cotton, linen, silk, wool, hemp, flax, and a combination thereof.

5. The wipe according to claim 3, wherein the synthetic material is selected from the group consisting of polypropylene, polystyrene, polyester, nylon, rayon, acrylic, spandex, and a combination thereof.

6. The wipe according to claim 1, wherein non-woven substrate is selected from the group consisting of meltblown, coformed, spunbonded, airlaid, hydroentangled, spunlaced, bonded, carded, laminated, and a combination thereof.

7. The wipe according to claim 1, wherein the quaternary ammonium compound or combination of quaternary ammonium compounds is in a ratio to the oxazoline homopolymer of 1:4 to 1:1.

8. The wipe according to claim 1, wherein the quaternary ammonium compound is in an amount of at least 0.2 weight percent, and the weight percentage is based on total weight of the formulation.

9. The wipe according to claim 8, wherein the quaternary ammonium compound is in an amount of 0.2 weight percent to 2 weight percent, and the weight percentage is based on total weight of the formulation.

10. The wipe according to claim 1, wherein the surfactant is a nonionic surfactant.

11. The wipe according to claim 1, wherein the surfactant is an alcohol ethoxylate.

12. The wipe according to claim 11, wherein the alcohol ethoxylate is in an amount of 0.05 weight % to 0.5 weight %, and the weight percentage is based on total weight of the formulation.

13. The wipe according to claim 11, wherein the alcohol ethoxylate is a linear alcohol ethoxylate with at least 9 moles of ethylene oxide.

14. The wipe according to claim 1, wherein the fragrance is present in an amount of greater than 0 weight % to 0.5 weight %, and the weight percentage is based on total weight of the formulation.

15. The wipe according to claim 1, wherein the formulation further comprises an alcohol, a salt, an acid, or a combination thereof.

16. A wipe having a residual biocidal property, the wipe comprising:
    a woven or non-woven substrate comprised of a fibrous material, and
    a formulation present on or in the substrate;
    wherein the formulation comprises:
       1 weight % to 2 weight % of a poly(2-ethyl-2-oxazoline),
       at least 0.2 weight % of a quaternary ammonium compound or combination of quaternary ammonium compounds,
       0.1 weight % to 0.3 weight % of an alcohol ethoxylate with at least 9 moles of ethylene oxide, and
       a balance of water,
       wherein weight percentages are based on total weight of the formulation.

17. The wipe according to claim 16, wherein the substrate is comprised of a material selected from the group consisting of a natural material, a synthetic material, and a combination thereof.

18. The wipe according to claim 17, wherein the synthetic material is selected from the group consisting of polypropylene, polystyrene, polyester, nylon, rayon, acrylic, spandex, and a combination thereof.

19. The wipe according to claim 16, wherein the alcohol ethoxylate has at least 12 moles of ethylene oxide.

20. The wipe according to claim 16, wherein the formulation further comprises 0.05 weight percent to 0.2 weight percent of a fragrance.

* * * * *